B. FIELD & G. M. PULLMAN.
SLEEPING CAR.
No. 3,254. Reissued Jan. 5, 1869.
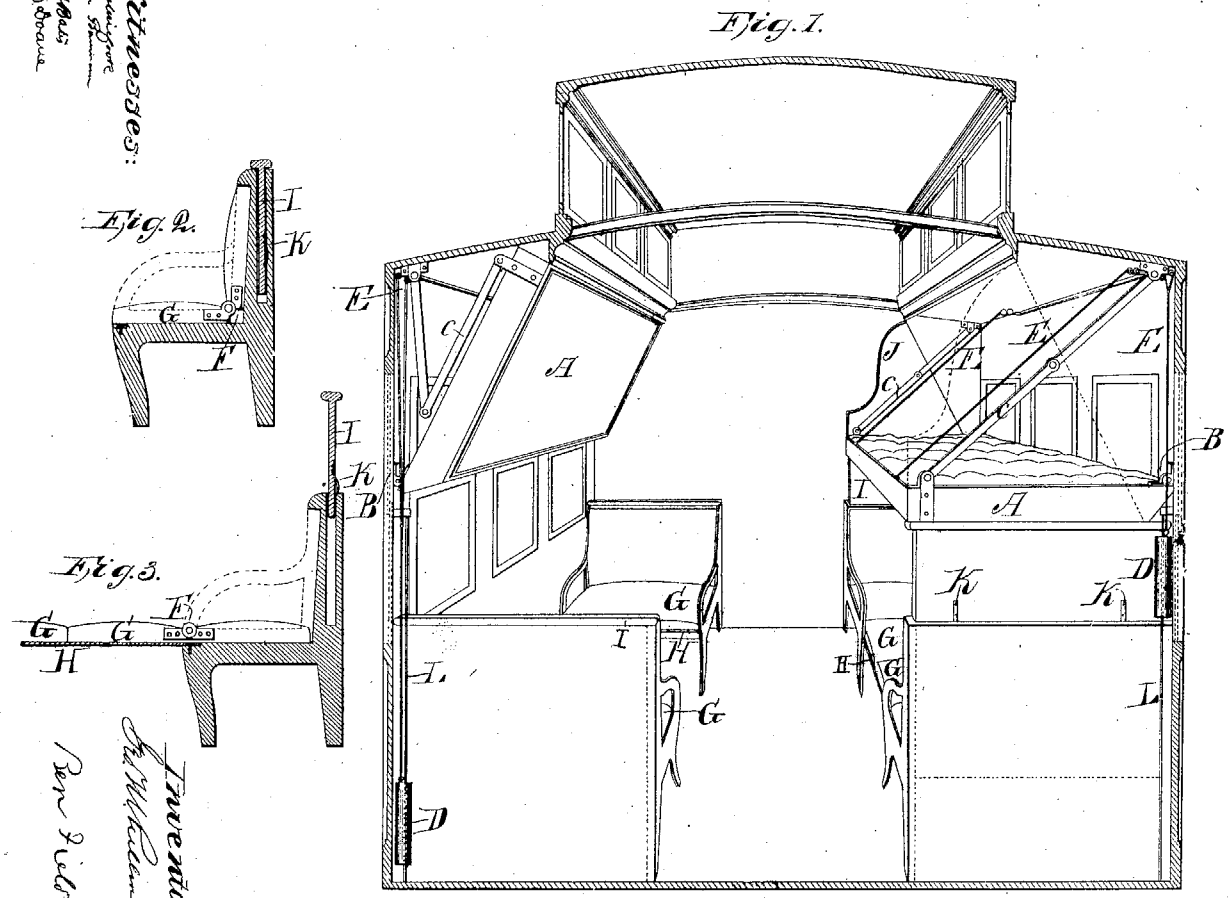
Witnesses:
Geo. Hammond
O. H. Ball
M. G. Soane
Inventor:
Geo. M. Pullman
Ben Field
THE NORRIS PETERS CO., PHOTO-LITHO., WASHINGTON, D. C.

United States Patent Office.

GEORGE M. PULLMAN, OF CHICAGO, ILLINOIS, ASSIGNEE, BY MESNE ASSIGNMENTS, OF HIMSELF AND BEN FIELD,

*Letters Patent No.* 49,992, *dated September* 19, 1865; *reissue No.* 2,862, *dated February* 11, 1868; *reissue No.* 3,254, *dated January* 5, 1869.

IMPROVEMENT IN SLEEPING-CARS.

The Schedule referred to in these Letters Patent and making part of the same.

*To all whom it may concern:*

Be it known that BEN FIELD, formerly of Albion, in the county of Orleans, and State of New York, and GEORGE M. PULLMAN, of Chicago, in the county of Cook, and State of Illinois, did invent certain new and useful Improvements in Sleeping-Cars for Railways, for which Letters Patent were granted, September 19, 1865, and reissued, February 11, 1868, which said invention, with the Letters Patent intended to secure the same, have, by assignments dated September 23, 1867, and October 24, 1868, now become the exclusive property of me, the said GEORGE M. PULLMAN, as assignee of the said FIELD and PULLMAN; and I do hereby declare that the following is a full, clear, and exact description of the same, reference being had to the annexed drawings, making part of this specification, in which—

Figure 1 is a perspective view of the interior of a portion of a car containing one set of berths on each side of the car, one side being represented in the form for use as a day-car, and the other side as a sleeping-car;

Figure 2 is a cross-section of one of the seats, as used for a day-car; and

Figure 3 is a cross-section of one of the seats, as use for forming a sleeping-couch.

This invention relates to the method of constructing the seats and berths of a sleeping-car, so that they may be more readily and conveniently changed from the condition of a day-car to a sleeping-car, and *vice versa*, than by the modes of construction before used.

The first part of this invention consists in constructing the berth with a rigid frame, of the proper form to receive the bedding, which frame is permanently attached to the side of the car by fixed hinges, and when not in use is swung up in a diagonal position, the front edge being secured to a suitable frame, attached to the roof of the car, and thus closing the recess and forming a closet, in which the bedding in that compartment can be placed when not in use, and be entirely secreted and protected from the dust, smoke, and cinders; also, in the employment, in combination with a berth thus constructed, of a counterpoise, so arranged as to aid in turning up the same, so that the berth and its contents may be more easily handled, with other peculiarities of construction therewith, which will be hereafter described; and also, in the manner of constructing and arranging the seats of the car, so that the cushions of the same may be readily converted into lower berths, as will be hereafter described.

A A are the upper berths, each formed of a rigid platform or frame, and provided with a suitable enclosure for the bedding, and made, by preference, about as wide as the length of the transverse seats, as shown.

They are each permanently connected with the side of the car by strong hinges, at B, at a suitable height above the seat, which supports that side of the berth, the opposite side being supported, when it is used, by the jointed suspenders C, which have a pin-joint at each end, and near the middle, to enable them to fold together when the berth is turned up, as shown, one end of each suspender being attached to the front edge of the berth, and the other end to the roof, near the upper corner of the car, by suitable joint-pieces.

When the car is used as a day-car, the front edge of the berth A is raised up to an angular position, until the front side of it nearly touches the roof of the car, and the lower edge is brought into contact with the cornice-frame or moulding N. The berth is held in this elevated position by a spring-catch, or other suitable fastening, in which position it is entirely out of the way, and the mattresses, bedding, and other accessories, are shut out of sight into the closed triangular recess in the upper corner of the car.

The upper berths, when made broad, as shown, with the bedding and other furniture of one section of the car placed upon them, have considerable weight, and to enable them to be easily handled, they are counterbalanced by means of weights D, running on rods L, to steady them, and the cords E, working over suitable pulleys, and attached to the front side of the berth, so that the berths move easily up and down by hand.

The weights D, upon either side of the car, may be enclosed in a closet, in the centre of the car, and wire rope, or other cords, lead over pulleys from them to each berth.

If the upper berths are made somewhat narrower, they may be so arranged as to throw them back against the side of the car, into a perpendicular position, the recess to receive them being, in that case, formed on the side of the car.

M represents one of the series of triangular partitions placed between the berths, extending from the upper berth to the roof of the car, and inwardly in a diagonal direction to the cornice N, which is usually placed just below the sides of the ventilating-chamber, in cars that are thus contructed, as is shown in the drawings.

The partitions form the ends of the recesses when the berths are turned up.

The lower surface of the berth is finished in some appropriate ornamental style, and fits closely to the partition and cornice, forming a neat and handsome inclined ceiling to the upper part of the car, and, as already explained, an enclosure in which the bedding and other furniture of the berths can be secured and carried, free from dust, smoke, or cinders.

The seats are arranged in pairs, facing each other, as shown, and at a sufficient distance apart to give length for a berth between the frames of the backs.

The cushions forming the back and seat of each chair are made separate from the seat-frames, and hinged together at F.

When the lower couch has to be made up for sleeping, the seat-cushions G are drawn forward until the cushion G′, forming the back, lies horizontally on the seat-frames, the cushions G meeting together, and one end resting on the bar H, which turns on a hinge from one of the seats or chairs, as shown in the drawings. The other ends of the cushions G are supported by resting on a cleat of wood, fastened to the side of the car.

A continuous horizontal couch is thus formed by the four cushions, upon which such bedding as is desired may be placed.

The back of the chairs may be made double, so as to receive a sliding partition, I, which sinks between the backs when the car is used as a day-car, and is drawn up against the bottom of the upper berth when used as a sleeping-car, and is held up by the spring-catches K, thus affording an additional support to the upper berth.

J is a movable head-board, which, when the berth is made up, is slipped in to fill up the space at each end of the berth between the sliding partition I and the partition M.

It is held in place by hasps, or other suitable attachments, which will allow it to be readily removed and placed upon the upper berth with the bedding, and enclosed in the recess above the berth, when it is turned up.

I do not claim the use of sliding head-boards; but

What is claimed as the invention of the said FIELD and PULLMAN, is—

1. The construction and arrangement of the berth A, hinged to the car at B, and supported by the jointed suspenders C, or other analogous devices, the whole so adapted to the car, that when turned up it forms one side of the closed triangular recess, as shown.

2. In combination with the berth A, the sliding partition I, substantially as shown.

3. In combination with the berth A, the movable head-board J, substantially as described.

4. The construction and arrangement of a car-seat, with the back and seat-cushions hinged together, and disconnected from the seat-frame, so that the back cushion may be placed on the seat-frame, and the seat-cushion extended to meet the seat-cushion of the opposite seat, substantially as described.

GEO. M. PULLMAN.

Witnesses:

M. B. PHILIPP,

CHAS. W. ANGELL.